United States Patent Office 3,485,820
Patented Dec. 23, 1969

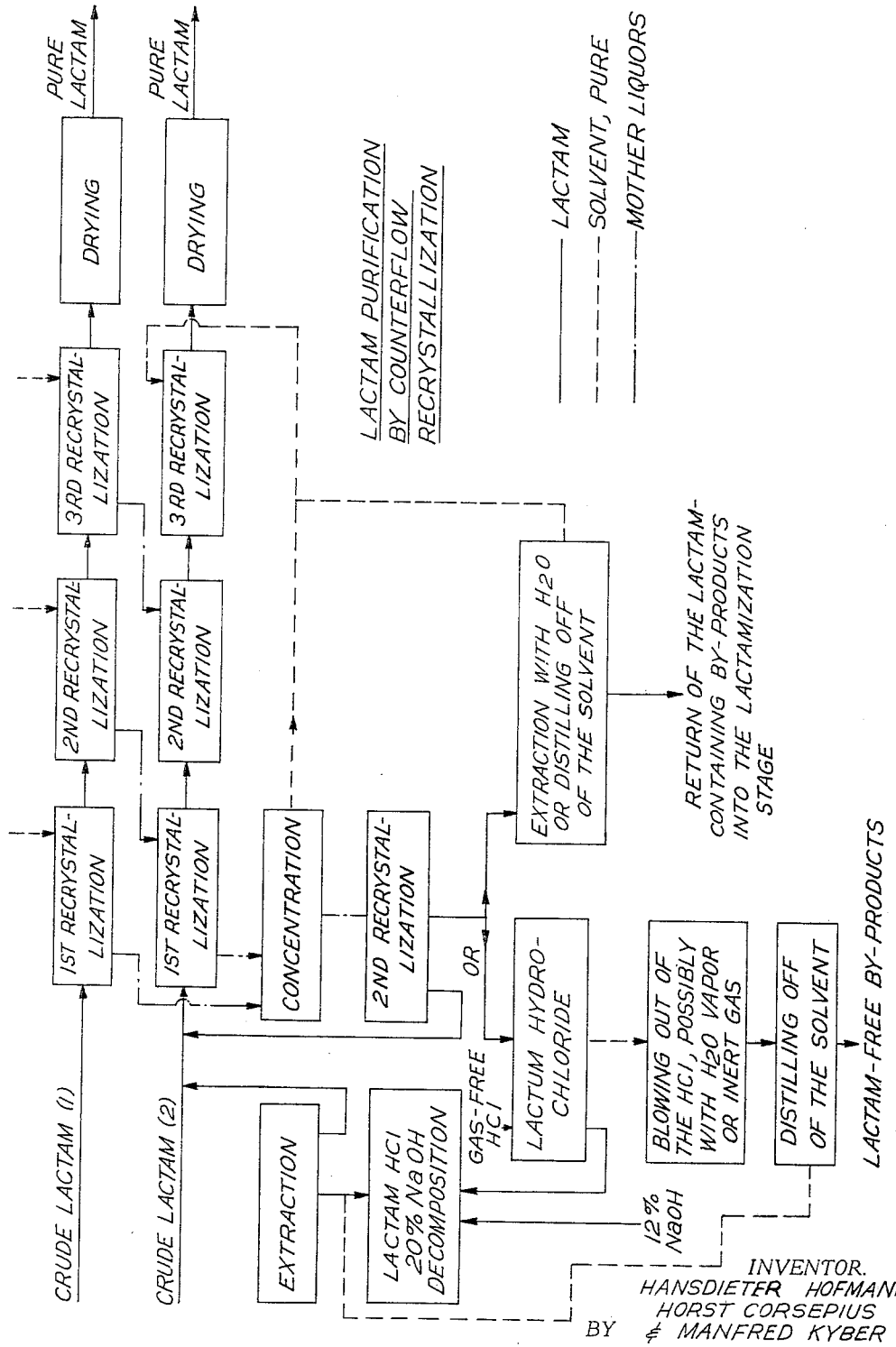

3,485,820
PROCESS FOR THE PURIFICATION OF
ε-CAPROLACTAM
Hansdieter Hofmann, Petterweil kreis Friedberg, Horst Corsepius, Frankfurt am Main, and Manfred Kyber, Bergen-Enkheim, Germany, assignors to Vickers-Zimmer Aktiengesellschaft Planung und Bau von Industrieanlagen, Frankfurt am Main, Germany
Filed Aug. 15, 1966, Ser. No. 572,470
Int. Cl. C07d 41/06
U.S. Cl. 260—239.3                7 Claims

ABSTRACT OF THE DISCLOSURE

A process for the purification of crude ε-caprolactam by multiple recrystallization from organic semipolar or alkyl aromatic solvents in which the solubility of the ε-caprolactam at 10° C. is less than 30 g. of the lactam per 100 g. of the solvent.

---

This invention relates to the purification of ε-caprolactam used in the manufacture of Nylon 6 fibers, particularly ε-caprolactam prepared by ammonolysis.

It is a known practice to purify crude ε-caprolactam produced according to the Beckmann rearrangement of cyclohexanone oxime with subsequent extraction of the neutralized reaction solution by fractionate distillation of the evaporation residue or by recrystallization from solvents. This practice is said to achieve fiber-grade quality lactam and good recovery yields. Solvents especially suitable are aliphatic hydrocarbons, such as, for example, n-heptane, cyclohexane, gasoline fractions and the like. Mixtures of said hydrocarbons with chlorinated hydrocarbons are likewise used for the purification of crude lactams.

Heretofore, water was also used for the purification of contaminated lactam.

Besides obtaining lactam by way of the Beckmann rearrangement of cyclohexanoneoxime, which is widely used commercially, other reactions, too, lead to ε-caprolactam, such as, for example, hydrolysis of ε-aminocapronitrile, reaction of cyclohexanone with hydrazoic acid (Schmidt's reaction) and ammonolysis of ε-caprolactone.

Because ε-caprolactone is now readily available, the ammonolysis process has great prospect of technological realization. Especially favorable here is the fact that practically no ammonium sulfate is yielded, the disposal and further use of which is becoming more and more difficult.

However, these salt-free lactam processes are disadvantageous in that the crude lactam produced is much less pure than that produced by the Beckmann rearrangement. The purification is rendered difficult, above all, by the presence of 1,6-disubstituted, non-ring-form $C_6$-compounds and lower lactams. These compounds are so similar in their chemical and physical behavior to that of ε-caprolactam that they cannot satisfactorily be removed by the conventional lactam-purifying methods, such as extraction and rectification even in a combined manner of operation. These impurities impair the quality of fibers produced from the caprolactam. The solvents or solvent mixtures mentioned in the above-described recrystallization processes fail to purify satisfactorily lactams produced by ammonolysis.

We have found that crude lactam can be purified economically to products with fiber quality, if the crude lactam is subjected to a multi-stage recrystallization from solvents with specific solution properties.

The object of the invention is a process for the purifying of crude ε-caprolactam by crystallization from one or more solvents with the characterizing feature that crude ε-caprolactam is recrystallized two or more times from organic solvents in which the solubility of the ε-caprolactam at 10° C. is less than 30 g. of the lactam per 100 g. of solvent. The preferred organic solvents for the purpose of the invention include aliphatic monocarboxylic acid esters contains 5 to 11 carbon atoms, alkyl ketones containing 4 to 10 carbon atoms, and monoalkyl or dialkyl benzenes containing 8 to 10 carbon atoms.

The purification process for crude lactams according to the invention has proved especially favorable for crude lactams produced by ammonolysis of ε-caprolactone and which contains as by-products predominantly ε-hydroxycaproic acid nitrile, aminocaproic acid amide, ε-aminocaproic acid nitrile, saponifiable steam-volatile monocarboxylic acids, lower lactams and similar compounds that are difficult to remove. Preferably solvents are used which have semipolar properties and whose boiling points preferably lie below 180° C. The recrystallization of the crude caprolactam is carried out with a ratio of solvent to lactam ranging from 0.25:1 to 2.5:1. Especially preferred is a quantitative ratio of 0.75:1 to 1.5:1.

The lactam purified according to the process of the invention can thereupon be subjected to a treatment with steam or nitrogen, which may be carried out in a vacuum in order to remove retained solvent traces.

For the achievement of a good yield in the purification and recovery from the lactam-containing mother liquor after separating off of the crystallizate of the first recrystallizing step and possibly after separating off of a second crystal fraction, a mixture of additional ε-caprolactam and impurities is separated off. The separation of this mixture from the solvent is accomplished either through extraction with water or by distilling off the solvent. The mother liquor residue is then returned to the ammonolysis. A further possibility of working up the mother liquor is that of precipitating the caprolactam present as the hydrochloride by introduction of dry hydrochloric acid. The resulting hydrochloride can, after separation, be decomposed in a known manner with diluted alkalies and be converted into lactam by extraction with solvents. There, expediently, the solvent from the multistage recrystallization process may be reused. At this point, the mother liquor remaining contains only slight amounts of lactam and can then be thrown out or can be subjected wholly or in part to ammonolysis into lactam, by itself or with fresh crude ε-caprolactam. The solvents used are purified in a known manner by distillation or by extraction with water.

The execution of the purification according to the invention by multistage recrystallization can be carried out especially advantageously as a continuous counterflow crystallization.

The process of the invention has proved especially economical and favorable because it is possible to dispense with any chemical treatment, such as are described in the lactam purification processes of the prior art.

The following examples are to describe the process according to the invention for the purification of crude lactams, which come predominantly from the abovementioned "salt-free" lactam syntheses. Also regenerate lactam, pre-run lactam or lactam from distillation residues can be successfully recovered and purified by the method of the invention.

EXAMPLE 1

A crude lactam coming from the ammonolysis of ε-caprolactone and already concentrated had the following composition:

|  | Percent |
|---|---|
| Lactam | 84.6 |
| Water | 0.9 |
| Volatile ammoniac | 0.88 |

The residue is made up of high-boiling organic by-products. The solidification point was 60° C. and the potassium permanganate consumption amounted to ca. 50 g./1000 g. of crude lactam, and the pH value of a 10% solution was 11.4.

A 20 g. sample of the crude lactam was dissolved in 10 g. of each of the solvents listed in the table below and brought to crystallization under agitation at +5 to +10° C. Then suction was applied in a vacuum filter and after-washing was done with a little solvent. For the removal of the solvent, drying was carried out in a vacuum dryer at 55 to 60° C.

The solvents can be regarded as suitable which yield with maximal production of lactam the best quality of lactam as measured by the hardening point.

TABLE

| Solvent | Solubility ε-caprolactam at 10° C. in g. per 100 g. solvent | Lactam yield with reference to the lactam used, percent | Hardening point of the lactam, ° C. | Evaluation of the solvent |
|---|---|---|---|---|
| Acetic acid ethyl ester | 32 | 75.8 | 66.8 | Conditionally usable. |
| Acetic acid n-butyl ester | 16 | 81.5 | 66.7 | Good. |
| Acetic acid sec. butylester | 22 | 79.2 | 66.9 | Do. |
| n-Butyric acid n-butyl ester | 11 | 84.6 | 66.6 | Do. |
| Propionic acid isoamyl ester | 10 | 82.5 | 67.0 | Do. |
| Capronic acid ethyl ester | 12 | 84.1 | 66.3 | Do. |
| Pelargonic acid ethyl ester | 6 | 85.8 | 67.9 | Do. |
| Methyl isobutyl ketone | 25 | 81.2 | 66.7 | Do. |
| Di-isobutyl ketone | 10 | 78.6 | 66.8 | Do. |
| 5-methyl hepanone-3 | 16 | 81.6 | 67.2 | Do. |
| P-cymole | 25 | 79.9 | 66.7 | Do. |
| Cumole | 16 | 80.3 | 67.1 | Do. |

The experiments clearly show the differences between the classes of solvents. The best purification effect with maximal lactam yield is given by the higher esters, ketones and alkyl aromatic substances. Acetic acid ethyl ester has the drawback that it has somewhat too great a solubility for lactam and too high a volatility. These properties stand in the way of its economical utilization. The lactam yield in this series of tests ought to be greater than 79%. Further, it is apparent that with these impurities one recrystallization is by no means sufficient.

EXAMPLE 2

500 g. of a crude lactam obtained from ammonolysis of ε-caprolactone and concentrated, which contained 81.2% lactam and had a hardening point of 58° C., was dissolved with heat in 500 ml. of sec.-butyl acetate and crystallized under agitation at 0° C. Thereupon the crystals were drawn off by suction onto a vacuum filter and after-washed with 100 ml. of solvent. After drying, there remained 264.7 g. of lactam with a hardening point of 68.5° C. After concentration and through recrystallization, there were additionally obtained 83 g. of a second crystal fraction with a solidification point of 68.1° C.

This corresponds to a yield of 86.6% of the lactam present which, after repeated recrystallization under the same conditions, had a solidification point of 68.7° C. and a permanganate number of 200 sec.

For the recovery of the remaining amount of lactam, there was introduced into the mother liquor of recrystallization, dry gaseous hydrochloric acid under cooling to saturation. Thereupon, the crystalline deposit was drawn off on a glass frit suction filter. The deposit was decomposed in a known manner under cooling with diluted caustic solution and extracted exhaustively with benzene. After distilling off of the benzene, there remained 76.8 g. of residue which contained 73.1% of lactam.

The mother liquor can be freed of the dissolved hydrochloric acid by heating and introduction of nitrogen and then appears as a brown, somewhat viscous liquid which contains only traces of lactam.

With the lactam which was obtained through the de-lactamization of the mother liquor, the recovery or purification yield amounts to 99.5%.

EXAMPLE 3

250 parts of the crude lactam described in Example 2 were dissolved in heat in 200 parts of n-amylacetate and crystallized at 0° C. After drawing off by suction, after-washing was done with 70 parts of solvent and thereupon drying was carried out in a vacuum at 55 to 60° C. There were obtained 151.4 parts of lactam with a solidification point of 68.3° C. After the concentrating of the mother liquor, there were obtained 31.2 parts more of lactam.

The recovery yield up to this point amounted to 89.9%. After distilling off the solvent there remained a residue liquid at room temperature of 67.1 parts which still contained 30.5% of lactam. The liquid residue was returned in this form to the ammonlysis of the ε-caprolactone.

Two further recrystallizations carried out in the same manner with the above solvents led, after drying, to a lactam with the following characteristic numbers: Hardening point +68.6° C. and potassium permanganate number 2000 sec. A polymerized and spun sample of the lactam yielded a good result with completely normal polymerization and spinning behavior.

EXAMPLE 4

The continuous counterflow crystallization is carried out according to the flow sheet shown in the accompanying drawing. 250 parts of crude lactam (composition of Example 2) were, as described in Example 3, recrystallized three times in succession, in each case with fresh solvent. After this passage, the first recrystallization of another stream of crude lactam was carried out using the mother liquor of the second recrystallization of the first stream. The second recrystallization of the second stream was effected using the mother liquor of the third recrystallization from the first stream. For the third recrystallization, from which the pure lactam emerges, fresh solvent was used in each stream.

From the mother liquor of the first recrystallization of each stream, through condensation and recrystallization there was obtained a second crystal fraction which, together with the crude lactam, was returned to the first recrystallization. The solvent recovered in the concentration of the mother liquor was used again in the third recrystallization. Alternatively, the mother liquor obtained after recovery of this second crystal fraction can, as described in Example 2, be freed of residual lactam by introduction of hydrochloric acid. Other means of lactam recovery are the extraction of the lactam and by-products with water, or evaporation of the solvent and return of the whole mother liquor residue into the ammonolysis.

The ε-caprolactam recovered from the mother liquor in the form of lactam hydrochloride is likewise fed with the crude lactam back in the first recrystallization.

For the removal of the last solvent traces which are often stubbornly retained, the purified lactam, after the third recrystallization, was subjected to a vacuum treatment in a nitrogen atmosphere at temperatures around 100° C.

According to the counterflow recrystallization process described, there were used altogether 5×250 parts by weight of crude lactam according to Example 2.

Material balance (for five passages):

Raw material: Crude lactam 1250 parts, containing 1015 parts of lactam.

|  | Parts |
|---|---|
| Pure lactam obtained | 837 |
| Lactam-containing by-products, mother liquor residue from the after-crystallization (containing 46.8% of lactam) | 378 |
| Corresponding to a lactam amount of | 177 |

The solidification points lay at 68.6 and 68.7° C.
The PM number fluctuated between 1000 and 3000.
A polymerizate produced from the pure lactam exhibited excellent polymerization behavior and spinnability.

EXAMPLE 5

The first runnings from a continuous lactam distillation, in which recovered crude lactam from the Beckmann rearrangement was used, had the following properties:

Solidification point _____ 65.8° C.
Lactam content _____ 98–99%.
Potassium permanganate
  consumption _____ 1.7 g./1000 g. of lactam.

100 parts of these first runnings were brought into solution by heating with 100 parts of n-butylacetate. By cooling to 0° C. crystallization was carried out and the crystal suspension produced was sharply drawn off on a suction filter. The crystals were washed with 20 parts of solvent. After drying, 69.5 g. of ε-caprolactam were obtained with a solidification point of 68.4° C. and a PM number of 300 sec.

From the mother liquor there were additionally obtained through concentration 15.6 g. of a second crystal fraction also having a solidification point of 68.4° C.

50 parts of the first crystallizate were subjected in like manner with 50 parts of n-butyl acetate to a further recrystallization. After filtration and washing there were obtained on a centrifuge, after drying, 35.5 parts of ε-caprolactam, which had a solidification point of 68.6° C. and a PM number of 1300 sec.

The mother liquor of the second recrystallization can be used again successfully, as in Example 4, for the first recrystallization or there can be recovered by evaporation a further crystal fraction.

EXAMPLE 6

A residue from continuous lactam distillation exhibited the following properties:

Appearance _____ Dark brown, semicrystalline.
Lactam content _____ ca. 45%.
Potassium permanganate
  consumption _____ ca. 30 g./1000 g. residue.
Dimer lactam _____ ca. 15%.
Base number _____ 9.3.

This residue was dissolved in a little water, treated with ammonium sulfate and exhaustively extracted with benzene.

After evaporation of the extract there remained a lactam residue with a solidification point of 64.6° C. This lactam residue was recrystallized three times in succession with n-butyl acetate in the ratio of 1:1, according to Example 5. After each recrystallization, the most important features of the ε-caprolactam, solidification point and the PM number, were determined. (See table below.)

TABLE

|  | SP, °C. | PM No. sec. |
|---|---|---|
| Crystallizate from 1st recrystallization | 68.0 | 25 |
| Crystallizate from 2nd recrystallization | 68.5 | 60 |
| Crystallizate from 3rd recrystallization | 68.6 | 200 |

By the recrystallization according to the invention, it is possible to produce a usable ε-caprolactam even from residual lactam of very poor quality.

What is claimed is:

1. Process for the purification of crude ε-caprolactam produced by ammonolysis of ε-caprolactone by crystallization from solvent, characterized in that crude ε-caprolactam is recrystallized at least twice in a continuous multistage counterflow crystallization from organic semipolar solvents selected from the class of aliphatic monocarboxylic acid esters containing 5 to 11 carbon atoms and aliphatic ketones containing 4 to 10 carbon atoms.

2. Process according to claim 1 in which said organic solvents are aliphatic monocarboxylic acid esters containing 5 to 11 carbon atoms.

3. Process according to claim 1, in which said organic solvents are aliphatic ketones containing 4 to 10 carbon atoms.

4. Process according to claim 1, in which said crude ε-caprolactam is the product of ammonolysis of ε-caprolactone and the mother liquor of recrystallization is subjected to treatment to remove additional caprolactam.

5. Process according to claim 4, in which said mother liquor is treated with dry hydrochloric acid to precipitate caprolactam hydrochloride, the hydrocloride is decomposed to provide caprolactam and the caprolactam removed by solvent extraction.

6. Process according to claim 4, in which the mixture of caprolactam and impurities contained in the mother liquor is recovered and subjected anew to ammonolysis.

7. Process according to claim 1 wherein the ratio of solvent to crude lactam is about 0.25:1 to 2.5:1.

References Cited

UNITED STATES PATENTS 2,313,026   3/1943   Schlack _____ 260—239.3
2,813,858  11/1957   Joris _____ 260—239.3
3,359,260  12/1967   Roberts et al. _____ 260—239.3

HENRY R. JILES, Primary Examiner

R. T. BOND, Assistant Examiner